United States Patent [19]

Chesarek

[11] Patent Number: 4,888,694
[45] Date of Patent: Dec. 19, 1989

[54] ULTRASOUND IMAGING SYSTEM FOR RELATIVELY LOW-VELOCITY BLOOD FLOW AT RELATIVELY HIGH FRAME RATES

[75] Inventor: Richard H. Chesarek, Seattle, Wash.
[73] Assignee: Quantum Medical Systems, Inc., Issaquah, Wash.
[21] Appl. No.: 114,667
[22] Filed: Oct. 28, 1987
[51] Int. Cl.$^4$ .................... G06F 11/00; G06F 15/42
[52] U.S. Cl. .................... 364/413.24; 73/861.25; 128/660.01; 128/660.07
[58] Field of Search .................... 364/416, 507, 413.25; 128/662.04, 660, 661, 663, 660.01, 660.07, 660.08, 660.09; 73/600, 602, 861.25

[56] References Cited

U.S. PATENT DOCUMENTS

| | | | |
|---|---|---|---|
| 4,276,885 | 7/1981 | Ticker et al. | 128/662.02 |
| 4,328,707 | 5/1982 | Clement et al. | 128/661.02 |
| 4,612,937 | 9/1986 | Miller | 128/660.05 |
| 4,751,929 | 6/1988 | Hyakawa et al. | 364/413.07 |

Primary Examiner—Jerry Smith
Assistant Examiner—Kimthanh TBui
Attorney, Agent, or Firm—Seed and Berry

[57] ABSTRACT

An ultrasound blood flow imaging system employing a moving-target-type Doppler processor having a passband extending from zero hertz to the repetition frequency of the pulses generated and processed during each beam. The system is able to image low-velocity blood flow by reducing the frequency at which pulses are generated and processed during each beam, thereby increasing the gain of the flow processor at low frequencies. In order to avoid a corresponding decrease in the frame rate, the ultrasound pulses for several beams are alternately generated and processed in interleaved sequence rather than generating and processing all of the ultrasound pulses for each beam before generating and processing ultrasound pulses for the next beam.

7 Claims, 5 Drawing Sheets

COMMON MOVING TARGET FILTER

MOVING TARGET FILTER MODIFIED FOR
IMPROVED LOW VELOCITY PERFORMANCE

MOVING TARGET FILTER CHARACTERISTIC

CONVENTIONAL DOPPLER TIMELINE

FIG. 6

LOW VELOCITY DOPPLER TIMELINE

COMMON MOVING TARGET FILTER

FIG. 9

MOVING TARGET FILTER MODIFIED FOR IMPROVED LOW VELOCITY PERFORMANCE

FIG.10

ULTRASOUND IMAGING SYSTEM FOR RELATIVELY LOW-VELOCITY BLOOD FLOW AT RELATIVELY HIGH FRAME RATES

DESCRIPTION TECHNICAL FIELD

This invention relates to ultrasound imaging systems, and more particularly, to ultrasound systems for imaging moving sound scatterers using the Doppler principle.

BACKGROUND ART

Recently developed ultrasound imaging systems are capable of imaging moving sound scatterers in the circulatory system, thereby allowing visualization of the velocity of blood flow through the body. While it is fairly easy to image arterial flow and blood flow through the heart, it is substantially more difficult to image venous flow. Blood flow through arteries and the heart is highly pulsitile and typically of high velocity. This high-velocity blood flow can be imaged with conventional ultrasound imaging systems using the Doppler principle since the high-velocity blood flow produces a relatively high Doppler frequency. One commercially available ultrasound imaging system of this type is described in U.S. Patent Application Ser. No. 892,753, which is incorporated herein by reference.

Unfortunately, conventional Doppler ultrasound imaging systems are incapable of generating high-quality images of venous blood flow, primarily because of the low velocity of such blood flow. Ultrasound returns from low velocity venous blood flow have a very low Doppler frequency. Ultrasound returns from stationary or slowly moving tissue have either no Doppler frequency or a Dopper frequency that is even lower than the Doppler frequency of returns from venous blood flow. The Doppler frequency of returns from venous blood flow is thus very close to the Doppler frequency of returns from tissue, thereby making it difficult to distinguish between venous blood flow and tissue. Distinguishing between the Doppler frequency of returns from venous flow and the Doppler frequency of returns from tissue requires narrow band filters or correlators which can be implemented only with circuits requiring long integration times. Yet long integration times preclude rapid processing of ultrasound returns.

An ultrasound image, or "frame," is composed of a large number of beams, each of which is generated from a set of ultrasound returns taken at that beam location. As a result of the slow processing speed of the filters or correlators needed to image venous blood flow, generating the large number of beams making up an image requires a long period of time. This lengthy processing time results in unacceptably slow frame rates. The tradeoff between frame rate and flow velocity prevents existing ultrasound imaging systems from imaging venous blood flow at an acceptable frame rate.

DISCLOSURE OF THE INVENTION

The primary object of the invention is to provide an ultrasound imaging system that rapidly processes ultrasound Doppler returns from venous blood flow in order to provide an acceptably high frame rate.

It is another object of the invention to provide a system for imaging venous blood flow at an acceptable frame rate that utilizes most of the components of conventional imaging systems.

It is another object of the invention to provide an ultrasound imaging system that is capable of imaging venous blood flow and yet is not significantly more complex or expensive than comparable systems that are incapable of imaging venous flow.

These and other objects of the invention are provided by an ultrasound imaging system generating a plurality of ultrasound pulses at each of a plurality of beam locations, and processing ultrasound returns through a moving-target bandpass filter having a passband gradually approaching zero gain at zero hertz and $f_{PRF}$ (the system pulse repetition frequency) at each end of its passband. Instead of processing all of the ultrasound returns for each beam before processing ultrasound returns for other beams, ultrasound returns for several beams are processed in a time-shared sequence. The system includes an ultrasound transducer having a plurality of transducer elements. Each of the transducer elements generates an ultrasound pulse responsive to receipt of a respective electrical transmitter signal from a transmitter. Each of the transducer elements also generates an electrical receiver signal responsive to receipt of ultrasound returns reflected from tissue in contact with the transducer. A receiver coupled to the ultrasound transducer receives the electrical receiver signals from the transducer elements. A controller causes either a single transmitter signal to be applied to one of the transducer elements or a plurality of the transmitter signals to be simultaneously applied to a plurality of respective transducer elements positioned adjacent each other. As a result, the transducer generates an ultrasound pulse at a respective beam location on the transducer. The controller further causes the receiver to process either a single receiver signal from one of the transducer elements or a plurality of receiver signals from a plurality of respective transducer elements positioned adjacent each other at a beam location corresponding to the beam location of the transmitted ultrasound pulse. The controller causes the transducer to repetitively generate, and the system to process, K sets of ultrasound pulses, each set consisting of a sequence of a single ultrasound pulse generated at each of N different beam locations. The system further includes a moving-target bandpass filter having a passband extending from zero hertz to $f_{PRF}$ where $f_{PRF}$ is the frequency at which an ultrasound pulse is generated at each of the N different beam locations. A data memory coupled to the moving-target bandpass filter records blood flow data from ultrasound returns generated from the K sets of ultrasound pulses at the N different beam locations. The system also includes a filter processor receiving the blood flow data from the data memory. The filter processor generates flow velocity data indicative of the blood flow velocity at each of the N beam locations as a function of the receiver signals generated from K ultrasound pulses at each beam location. The flow velocity data from the filter processor and data from the controller indicative of the beam location at which the flow velocity data are received are applied to a display for providing an image of blood flow beneath the transducer.

BEST MODE FOR CARRYING OUT THE INVENTION

Figure 1A:
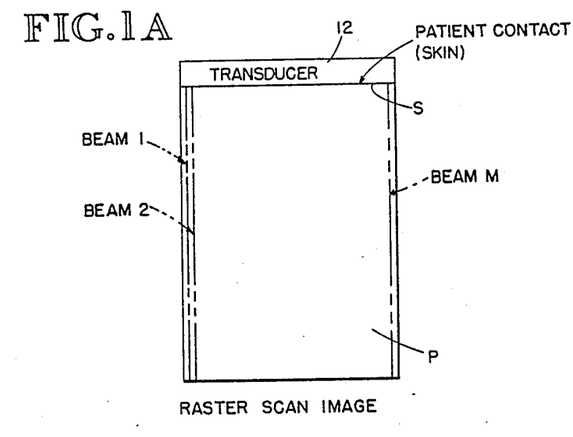
FIGS. 1A and 1B are schematic drawings illustrating two conventional varieties of scan patterns used to display blood flow images.

Conventional ultrasound blood flow imaging systems generally operate in two distinct scan modes. In a raster scan, as illustrated in FIG. 1A, an ultrasound transducer 12 is placed against the skin S of a patient P. The ultrasound transducer 12 includes a large number of transducer elements, each of which generates a pulse of ultrasound energy upon receipt of an ultrasound transmit signal. The transducer elements also each generate an electrical receiver signal when they detect ultrasound returns reflected from tissue and/or moving sound scatterers in the blood vessels of the patient P.

The transducer elements, either alone or in groups of adjacent elements, implement a series of ultrasound beams, each of which detects tissue moving sound scatterers in the volume beneath the element(s) forming the beam. Thus, in the example illustrated in FIG. 1A, the leftmost transducer element or group of adjacent elements forms beam 1 while the next transducer element or group of adjacent elements forms beam 2. The rightmost transducer element or group of adjacent elements forms beam M. In the event that the beams are formed by respective groups of elements, the beams may overlap so that a given transducer element may be used as part of two different beams. As is well understood in the art, the use of multiple transducer elements to form beams allows the beam to be focused to a particular depth.

In a raster scan (illustrated in FIG. 1A), the beams are active in sequence so that each beam examines a volume extending from the transducer into the patient P. The resulting image obtained by a raster scan generally simulates a cross section through the tissue of a patient.

Figure 1B:
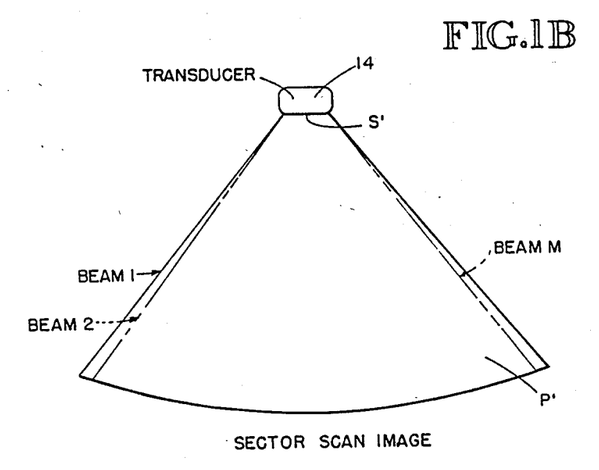

A sector scan (illustrated in FIG. 1B) is also composed of multiple beams, each of which may be formed by a single element or several adjacent elements of an ultrasound transducer 14. However, unlike the raster scan beams (which extend into the patient in parallel with each other), the sector scan beams essentially emanate from a point and extend into the patient P' at varying angles. The inventive imaging system can be advantageously used with either a raster scan or a sector scan imaging system.

Figure 2:
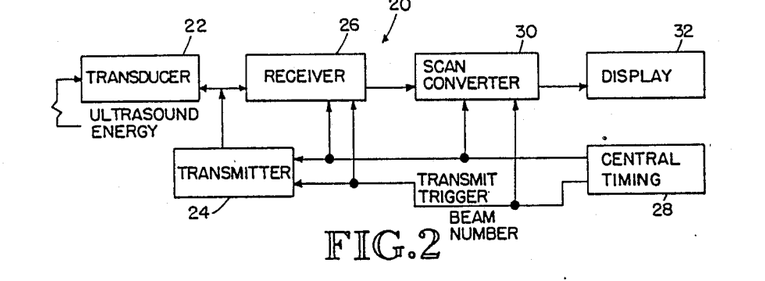
FIG. 2 is a block diagram of a conventional ultrasound tissue imaging system.

Ultrasound imaging systems can be used to image either tissue or moving sound scatterers, such as blood flow. In a tissue imaging system 20, illustrated in FIG. 2, transducer 22, having multiple transducer elements, is placed against the skin of a patient. The transducer 22 is coupled to both an ultrasound transmitter 24 and an ultrasound receiver 26. The transmitter 24 is controlled by a central timing system 28 which triggers the transmitter 24 and causes it to apply a relatively high-power electrical signal to selected elements of the transducer 22. The elements selected are identified by a byte of data from the central timing system 28 specifying the beam number.

The ultrasound energy from the transducer is reflected from density discontinuities in the patient's tissue, which may be formed by the boundaries of various organs or by tumors, as well as being reflected by discrete scatterers such as blood cells. The reflected ultrasound returns are converted into relatively weak electrical signals by the transducer 22 which are then applied to the receiver 26. The receiver is also controlled by the central timing system 28. The transmit trigger pulse informs the receiver 26 when ultrasound returns are to be received, while the beam number data specify which transducer elements are to be considered active so that only electrical signals from the proper transducer elements are processed. The receiver 26 outputs image data to a conventional scan converter 30. The scan converter 30 generates a conventional video signal from the image data, and applies the video signal to a cathode-ray tube display 32. The scan converter 30 utilizes the beam number data from the central timing system to identify the location on the display 32 where the ultrasound returns from each of the beams are to be displayed. As a result, the position of the returns on the display 32 corresponds to the position of the transducer elements of each beam. In a tissue imaging system, such as the system illustrated in FIG. 2, only one ultrasound pulse per beam is needed to form an image.

Figure 3:
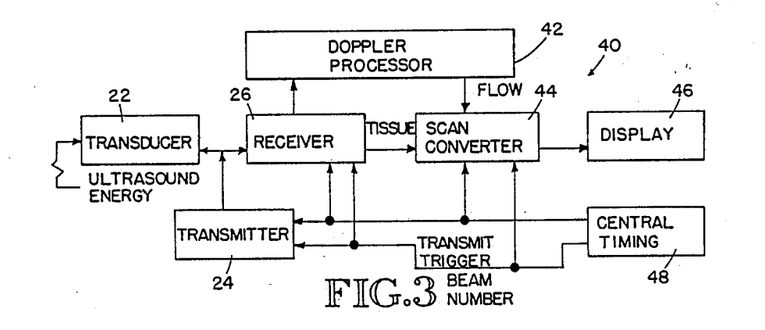
FIG. 3 is a block diagram of a conventional ultrasound blood flow imaging system utilizing the Doppler principle.

An ultrasound system for imaging moving sound scatterers, such as blood flow, is illustrated in FIG. 3. The system 40 may include the same transducer 22, transmitter 24, and receiver 26 used in the tissue imaging system of FIG. 2. However, the blood flow imaging system 40 of FIG. 3 utilizes a Doppler processor 42 that outputs a flow signal indicative of the velocity of moving sound scatterers at discrete depths or sample sites beneath the transducer element(s) forming each of the beams. These flow signals are applied to a scan converter 44 which outputs a video signal to a display 46 which is capable of distinguishing between stationary targets (tissue) and moving targets (blood). A common implementation uses gray scale images to represent tissue and color for moving targets. A central timing system 48, like the timing system 28 of the tissue imaging system 20 of FIG. 2, outputs a transmit trigger and beam number to the transmitter 24, receiver 26, and scan converter 44.

The Doppler processor 42 utilizes the Doppler principle to determine the velocity of moving sound scatterers in each beam. Basically, at discrete points in time, the frequency shift in the ultrasound return is measured to determine the flow velocity at each depth in the beam. In order to display a blood flow image, it is necessary to distinguish between ultrasound returns from moving sound scatterers and ultrasound returns from stationary or slowly moving tissue. This separation may be accomplished using a moving-target filter. The basic principle of operation of a moving-target filter is well known. The ultrasound returns at discrete depths from a first ultrasound pulse are recorded in memory, usually implemented with a conventional shift register. After the sampled data from the first ultrasound pulse have been recorded, they are subtracted from the sampled data from the same discrete depths or sample sites so that only the data that have changed from the previous ultrasound pulse remain. While the sample data from moving sound scatterers vary from pulse to pulse, the sampled data from tissue are constant from pulse to pulse. Thus, when the sampled data from one pulse are subtracted from corresponding sampled data of the next ultrasound pulse, only the data from moving sound scatterers remain. In order to provide adequate separation of Doppler frequencies from blood flow and tissue, the process of subtracting the sampled data of one ultrasound pulse from the sampled data of the previous ultrasound pulse is repeated several times.

Figure 4:
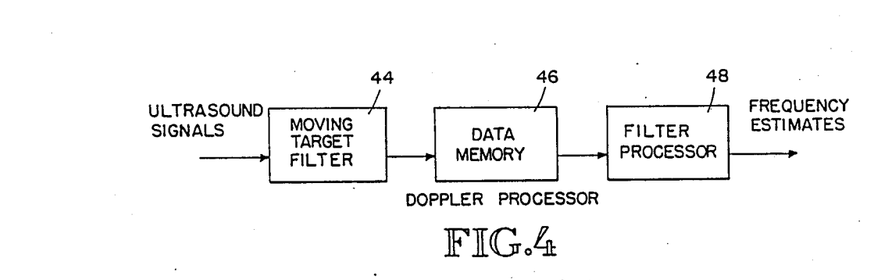
FIG. 4 is a block diagram of a Doppler processor that can be used with the ultrasound blood flow imaging system of FIG. 3 to implement one embodiment of the inventive blood flow imaging system.

One embodiment of a Doppler processor 42 is illustrated in FIG. 4. The Doppler processor 42 includes a conventional moving-target filter 44, a data memory 46 of conventional design, and a conventional filter processor 48. The moving-target filter 44 operates in conjunction with the data memory 46 to subtract the sampled data from each ultrasound pulse from the sampled data for the previous ultrasound pulse. The filter processor 48 receives the subtracted sample data for all of the ultrasound pulses at each sample site and assigns a velocity which best estimates the velocity corresponding to all of the subtracted sampled data. The filter processor 48 may operate by performing a discrete fourier transform calculation in a conventional manner. The output of the filter processor 48 is thus data indicative of a velocity of sound scatterers at discrete depths or sample sites in each beam.

Figure 5:
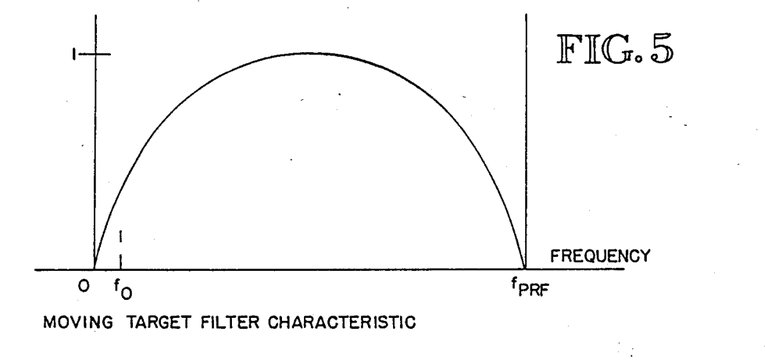
FIG. 5 is a graph illustrating the frequency response of a conventional moving-target filter used in the conventional ultrasound blood flow imaging system of Fig. 3.

The bandpass characteristic of conventional Doppler processors is illustrated in FIG. 5. The low-frequency null of the filter is at zero hertz, while the high-frequency null of the processor is at the frequency at which ultrasound pulses are generated at each beam location. The bandpass between the two nulls is smoothly curved and peaks at half of the frequency at which ultrasound pulses are generated at each beam. The reason for the null at zero hertz is readily apparent from the above explanation of the Doppler processor 42. Ultrasound returns having a Doppler frequency at zero hertz are from non-moving sound scatterers, such as tissue. The subtracted sampled data from tissue are thus always zero because the sampled data from tissue do not vary from pulse to pulse.

Figure 8:
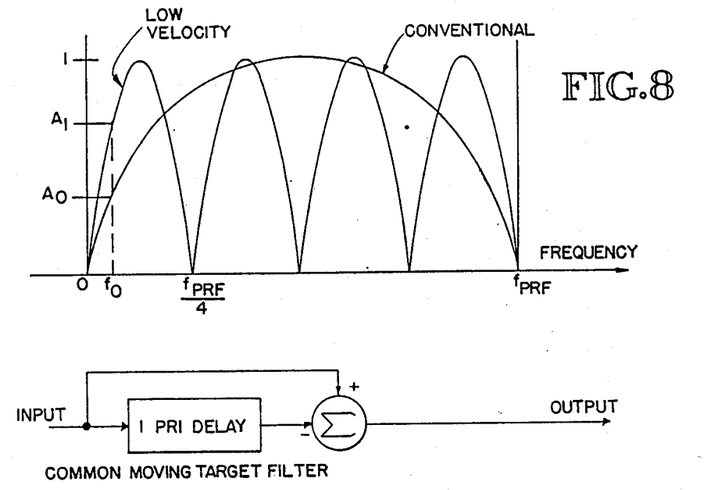
FIG. 8 is a graph illustrating the frequency response of a moving-target filter used in the inventive ultrasound blood flow imaging system, shown along with the frequency response of a moving-target filter used in a conventional ultrasound blood flow imaging system.

The low-frequency response of the Doppler processor 42 is of particular interest in attempting to image slowly moving sound scatterers, such as those found in venous flow. The slow velocity of venous flow results in relatively low Doppler frequencies $f_0$, illustrated in FIG. 5. However, the passband of the Doppler processor 42 at this frequency has a relatively low amplitude since the passband is approaching the null at zero hertz. As a result of the relatively low gain at low Doppler frequencies, it is difficult to image low-velocity venous blood flow. One technique for effectively increasing the gain of the Doppler processor 42 at a given frequency $f_0$ is to reduce the frequency at which pulses are generated during each beam, as illustrated in FIG. 8. In the example illustrated, by reducing the pulse repetition frequency by a factor of 4, the gain of the Doppler processor 42 at the frequency $f_0$ increases from $A_0$ to $A_1$.

However, decreasing the frequency at which pulses are generated during each beam can greatly reduce the "frame rate," which is the rate at which images can be generated. As mentioned above, each image frame is composed of data taken from several discrete beams. Each beam is formed by integrating sampled data over several ultrasound pulses. Thus, decreasing the frequency at which pulses are generated during each beam by a factor of 4 decreases the frame rate by a factor of 4. Lower frame rates prevent the imaging system from operating in essentially real time, thus severely limiting the usefulness of such blood flow imaging systems. There is thus an inherent tradeoff between the velocity at which blood flow can be imaged and the frame rate at which the image can be displayed.

Figure 6:
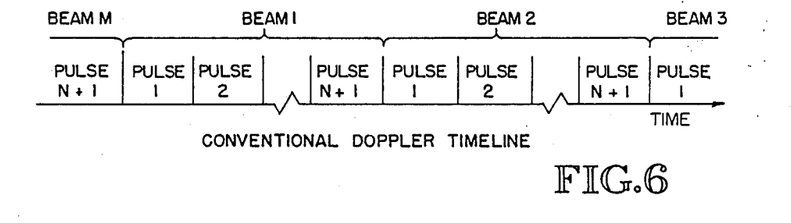
FIG. 6 is a timeline illustrating the operation of a conventional ultrasound blood flow imaging system such as the system illustrated in FIG. 2.

It has been found that the tradeoff that was apparently inherent in ultrasound imaging systems can be largely eliminated by altering the operation of conventional imaging systems. As illustrated in FIG. 6, conventional Doppler imaging systems form beam 1 by sequentially generating and processing several ultrasound pulses 1, 2 ... N + 1. The system then generates and processes ultrasound processes for the second beam in series 1, 2 ... N + 1. Thus, conventional Doppler imaging systems generate and process all of the ultrasound pulses for each beam prior to generating and processing ultrasound pulses for the subsequent beam.

Figure 7:
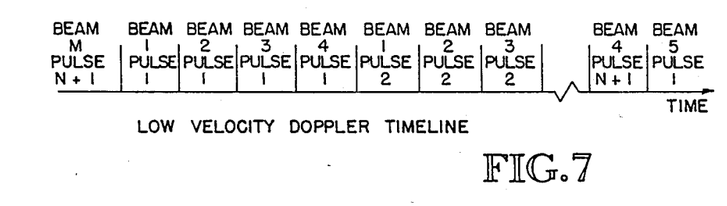
FIG. 7 is a timeline illustrating the operation of the inventive ultrasound blood flow imaging system.

The seemingly inherent tradeoff between the velocity of blood flow to be imaged and the frame rate of the image can be largely eliminated by interleaving the ultrasound pulses generated and processed at several beams, as illustrated in FIG. 7. A first pulse is generated and processed by the transducer element(s) forming the first beam. Instead of then generating and processing the second ultrasound pulse for the first beam, followed by the third, etc., the system generates and processes the first ultrasound pulse for the second beam, then for the third beam, and then for the fourth beam. The system then generates and processes the second ultrasound pulse for the first beam, followed by the second ultrasound pulse for the second, third and fourth beams. By interleaving the ultrasound pulses for several beams in this manner, the effective frequency at which pulses are generated and processed during each beam is reduced by a factor of 4. However, since ultrasound pulses are being generated and processed in other beams during the lengthened period between ultrasound pulses for each beam, the total time required to generate a frame remains the same. Thus, the low-frequency gain of the Doppler processor 42 can be increased without degrading the frame rate of the ultrasound imaging system.

Figure 9:
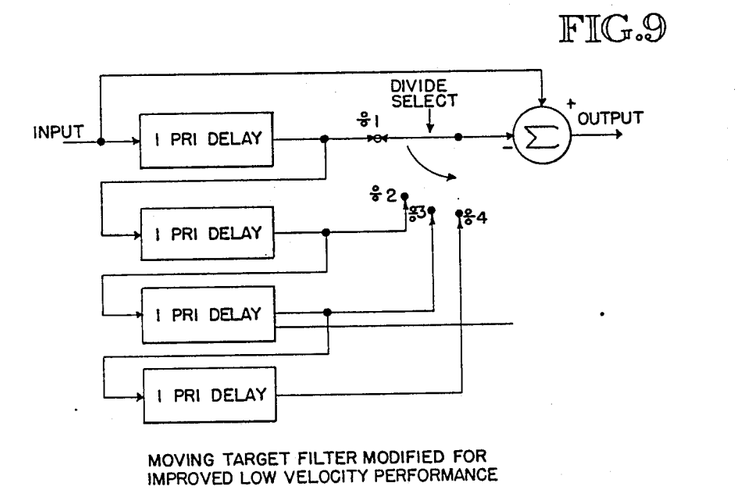
FIG. 9 is a block diagram illustrating the changes required for one implementation of a moving target detector to support enhanced low-velocity performance.
Figure 10:
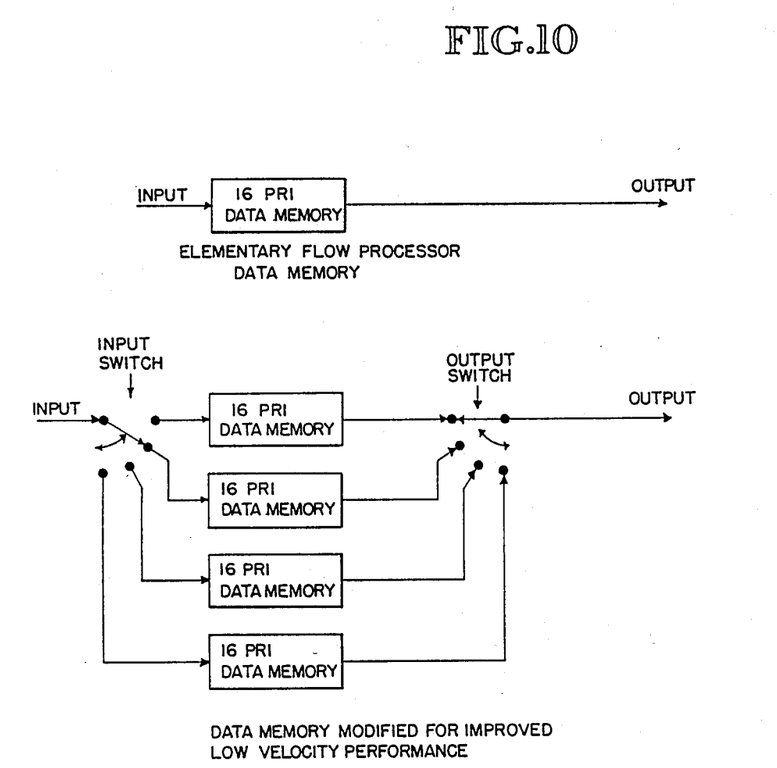
FIG. 10 is a block diagram illustrating changes for the Doppler processor data memory for enhanced low velocity performance.

The Doppler processor 42 must be modified in order to allow ultrasound pulses to be interleaved, as explained above. Specifically, the moving-target filter 44 and the data memory 46 must be enlarged by a factor equal to the reduction in pulse repetition frequency. In the example illustrated in FIG. 7, the pulse repetition frequency is reduced by a factor of 4. Thus, the capacities of the moving-target filter 44 and the data memory 46 must be increased by a factor of 4, as illustrated in FIGS. 9 and 10. The output switch on the moving-target filter 44 controls the divide-by factor. The input and output switches on the data memory 46, illustrated in FIG. 10, perform data reorganization, which allows the data to be stored as received in sequence and output to the filter processor 48 one beam's worth at a time.

Additionally, the receiver 26, transmitter 24, and central timing must be capable of generating and processing interleaved beam sequences. In a divide-by-2 implementation with 17 pulses per beam, the beam/pulse sequence changes from that of Table 1A to that of Table 1B; in a divide-by-4 implementation, the beam/pulse sequence changes to that of Table 1C.

TABLE 1

Image data collection sequences illustrating fundamental and modified beam/pulse data collection sequences

| BEAM | PRI | BEAM | PRI | BEAM | PRI |
|---|---|---|---|---|---|
| 1 | 1 | 1 | 1 | 1 | 1 |
| 1 | 2 | 2 | 1 | 2 | 1 |
| 1 | 3 | 1 | 2 | 3 | 1 |
| 1 | 4 | 2 | 2 | 4 | 1 |
| 1 | 5 | 1 | 3 | 1 | 2 |
| 1 | 6 | 2 | 3 | 2 | 2 |
| 1 | 7 | 1 | 4 | 3 | 2 |
| 1 | 8 | 2 | 4 | 4 | 2 |
| 1 | 9 | 1 | 5 | 1 | 3 |
| 1 | 10 | 2 | 5 | 2 | 3 |
| 1 | 11 | 1 | 6 | 3 | 3 |
| 1 | 12 | 2 | 6 | 4 | 3 |
| 1 | 13 | 1 | 7 | 1 | 4 |
| 1 | 14 | 2 | 7 | 2 | 4 |
| 1 | 15 | 1 | 8 | 3 | 4 |
| 1 | 16 | 2 | 8 | 4 | 4 |
| 1 | 17 | 1 | 9 | 1 | 5 |
| 2 | 1 | 2 | 9 | 2 | 5 |
| 2 | 2 | 1 | 10 | 3 | 5 |
| 2 | 3 | 2 | 10 | 4 | 5 |
| 2 | 4 | 1 | 11 | 1 | 6 |
| 2 | 5 | 2 | 11 | 2 | 6 |
| 2 | 6 | 1 | 12 | 3 | 6 |
| 2 | 7 | 2 | 12 | 4 | 6 |
| 2 | 8 | 1 | 13 | 1 | 7 |
| 2 | 9 | 2 | 13 | 2 | 7 |
| 2 | 10 | 1 | 14 | 3 | 7 |
| 2 | 11 | 2 | 14 | 4 | 7 |
| 2 | 12 | 1 | 15 | 1 | 8 |
| 2 | 13 | 2 | 15 | 2 | 8 |
| 2 | 14 | 1 | 16 | 3 | 8 |
| 2 | 15 | 2 | 16 | 4 | 8 |
| 2 | 16 | 1 | 17 | 1 | 9 |
| 2 | 17 | 2 | 17 | 2 | 9 |
| 3 | 1 | 3 | 1 | 3 | 9 |
| 3 | 2 | 4 | 1 | 4 | 9 |
| 3 | 3 | 3 | 2 | 1 | 10 |
| 3 | 4 | 4 | 2 | 2 | 10 |
| 3 | 5 | 3 | 3 | 3 | 10 |
| . | . | . | . | . | . |
| . | . | . | . | . | . |
| . | . | . | . | . | . |
| 4 | 12 | 3 | 15 | 3 | 16 |
| 4 | 13 | 4 | 15 | 4 | 16 |
| 4 | 14 | 3 | 16 | 1 | 17 |
| 4 | 15 | 4 | 16 | 2 | 17 |
| 4 | 16 | 3 | 17 | 3 | 17 |
| 4 | 17 | 4 | 17 | 4 | 17 |
| (a) Fundamental beam/pulse sequence | | (b) Divide by two beam/pulse sequence | | (c) Divide by four beam/pulse sequence | |

(increasing time ↓)

Although the inventive ultrasound imaging system has been illustrated as using a moving-target filter 44 in its Doppler processor 42, it will be understood that correlation implementations of conventional design may also be used.

It is thus seen that the inventive imaging system is capable of accurately and clearly imaging low-velocity blood flow while still providing frame rates that are sufficiently high to be effectively in real time.

I claim

1. An ultrasound blood flow imaging system comprising:

an ultrasound transducer having a plurality of transducer elements, each of said transducer elements generating an ultrasound pulse responsive to receipt of a respective electrical transmitter signal, each of said transducer elements further generating an electrical receiver signal responsive to receipt of reflected ultrasound returns;

a transmitter coupled to said ultrasound transducer, said transmitter generating said electrical transmitter signals;

a receiver coupled to said ultrasound transducer, said receiver receiving said electrical receiver signals from said transducer elements;

a controller causing either a single transmitter signal to be applied to one of said transducer elements or a plurality of said transmitter signals to be simultaneously applied to a plurality of respective transducer elements positioned adjacent each other so that said transducer generates an ultrasound pulse at a respective beam location on said transducer, said controller further causing said receiver to process either a single receiver signal from one of said transducer elements or a plurality of receiver signals from a plurality of respective transducer elements positioned adjacent each other at a beam location corresponding to the beam location of said ultrasound pulse, said controller causing said transducer to repetitively generate K sets of ultrasound pulses, each set consisting of a sequence of a single ultrasound pulse generated at each of N different beam locations;

a moving-target bandpass filter having a passband extending from zero hertz to fhd PRF, where $f_{PRF}$ is the frequency at which an ultrasound pulse is generated at each of said N different beam locations;

a data memory recording blood flow data from ultrasound returns generated from said K sets of ultrasound pulses at said N different beam locations;

a filter processor receiving said blood flow data from said data memory, said filter processor generating flow velocity data indicative of the blood flow velocity at each of said N beam locations as a function of the receiver signals generated from M ultrasound pulses at each beam location; ahd a display receiving said flow velocity data from said filter processor and data from said controller indicative of the beam location at which said flow velocity data is received for providing an image of blood flow beneath said transducer.

2. The blood flow imaging system of claim 1 wherein said ultrasound transducer includes a plurality of transducer elements arranged in a linear array, and wherein said display provides an image of blood flow in a raster scan format.

3. The blood flow imaging system of claim 1 wherein said ultrasound transducer is a sector transducer, and wherein said display provides an image of blood flow in a sector scan format.

4. The blood flow imaging system of claim 1 wherein said controller outputs to said transmitter, receiver, and display beam number data indicative of the transducer element of a group of adjacent transducer elements to which said electrical transmitter signals are applied and from which said electrical receiver signals are received and processed.

5. The blood flow imaging system of claim 1 wherein said display comprises a scan converter to said receiver outputting a video signal corresponding to the velocity and location of ultrasound returns, and a cathode-ray tube display receiving said video signal.

6. A method of allowing an ultrasound blood flow imaging system to image relatively slow flowing blood at an acceptable frame rate, said imaging system generating a plurality of ultrasound pulses at each of several different beam locations on an ultrasound transducer and processing ultrasound returns from tissue adjacent said transducer at each of said beam locations, said processing including passing signals derived from said ultrasound returns through a moving target bandpass filter having a passband gradually approaching zero hertz and the frequency at which an ultrasound pulse is generated at each of said several different beam locations, said method comprising interleaving the pulses generated and processed at each of said beam locations with pulses generated and processed at other beam locations so that pulses are generated and processed at each beam location in alternating sequence with pulses generated and processed at other beam locations.

7. The method of claim 6, wherein said transducer repetitively generates K sets of ultrasound pulses, each set consisting of a sequence of a single ultrasound pulse generated at each of N different beam locations.

* * * * *

UNITED STATES PATENT AND TRADEMARK OFFICE
CERTIFICATE OF CORRECTION

PATENT NO. : 4,888,694
DATED : December 19, 1989
INVENTOR(S) : Richard H. Chesarek It is certified that error appears in the above-identified patent and that said Letters Patent is hereby corrected as shown below:

In claim 1, column 8, line 31, please delete "fhd PRF" and substitute therefor --$f_{PRF}$--.

In claim 5, column 8, line 67, after "converter" please insert --connected--.

Signed and Sealed this

Twenty-ninth Day of October, 1991

*Attest:*

HARRY F. MANBECK, JR.

*Attesting Officer*     *Commissioner of Patents and Trademarks*